3,657,371
PROCESS FOR PREPARING ALKYLBENZENES
Benedetto Calcagno, Milan, Marcello Ghirga, Bresso, and Natale Ferlazzo, Milan, Italy, assignors to Società Italiana Resine S.p.A., Milan, Italy
No Drawing. Filed July 8, 1969, Ser. No. 840,020
Claims priority, application Italy, July 15, 1968, 18,978/68, Patent 839,022
Int. Cl. C07c 3/56
U.S. Cl. 260—671 B                                      7 Claims

ABSTRACT OF THE DISCLOSURE

A conventional process for preparing alkylbenzenes is carried out, wherein linear $C_9$–$C_{15}$ paraffins are chlorinated and catalytically alkylated with excess benzene, fractionated, and unreacted paraffins and benzene are recycled. According to the invention, by-products, especially chlorinated products, are removed from the unreacted paraffins by contacting the paraffins, prior to recycle, with concentrated sulphuric acid, oleum or sulphuric anhydride.

BACKGROUND OF THE INVENTION

The invention relates to an improvement in methods of preparing alkylbenzenes; more particularly it relates to the preparation of alkylbenzenes in which the alkyl radical is a linear paraffinic chain containing 9 to 15 carbon atoms. It is known that such products are highly valuable in the synthesis of biologically degradable detergents.

Most of the current widely used detergents are of the alkylbenzene sulphonate type and are manufactured by alkylating benzene by means of a mixture of olefins having about 9 to 15 carbon atoms in the highly branched molecule (propylene tetramer), and sulphonating the alkylation products. These compounds withstand metabolic attack by all types of bacteria. Consequently, they are not easily removed from sewage, which results in contamination of rivers.

This and other reasons have led to the development of alkylbenzenesulphonate detergents which are easily and completely biologically degradable.

Alkylbenzenes, alkyl substituent of which is a linear paraffinic chain, are normally prepared commercially by chlorination of linear (straight chain) paraffins, catalytic alkylation of benzene by means of the resultant chlorinated paraffins, separation of the catalyst, and fractionation of the alkylated product into the components of the mixture.

In such processes in order to obtain a maximum monochloroparaffin output, the chlorination step is carried out with a high paraffin/chlorine molar ratio, this ratio normally being 2/1 to 10/1. This yields a mixture of chlorinated paraffins and unaltered paraffins which, because of the difficulties of separation, is sent as such to the alkylation step. The unaltered paraffins are subsequently recovered by distillation from the alkylation products and are recycled to the chlorination stage.

It has been found that in the processes described by-products accumulate over a period of time, both in the recycled paraffins and in the alkylbenzenes produced. More particularly, chlorinated products accumulate in the alkylbenzenes, so that the chlorine content may reach inadmissibly high values, these alkylbenzenes often being of an undesirable smell.

The causes for this behaviour are not fully known, but it is believed that during the alkylation stage, by-products are formed, such as light alkylbenzenes which are formed by degradation of the heavier alkylbenzenes as well as by alkylation of the degradation products of the paraffin themselves. These by-products boil within the boiling range of the n-paraffins employed, and thus are difficult to separate from the resultant mixtures. When such by-products are recycled together with paraffins they may undergo further modifications at the chlorination and alkylation steps, and form heavier products which at the subsequent distillation step separate with the alkylbenzenes. Whichever the causes may be, the processes described yield alkylbenzenes with a high impurity content, particularly chlorinated products, and of an undesirable smell.

On account of the presence of the chlorinated by-products, such alkylbenzenes exhibit undesirable properties especially from the standpoint of corrosiveness and toxicity. The chlorine content of dodecylbenzenes for commercial use should be lower than about 1,000 parts per million.

SUMMARY OF THE INVENTION

We have now found that these by-products can be removed by a simple and inexpensive treatment of the recovered paraffins before recycling them to the chlorination stage.

According to the present invention, in a process wherein alkylbenzenes are prepared by partial chlorination of linear paraffins having 9 to 15 carbon atoms in the molecule, catalytic alkylation of the chlorinated paraffins with a stoichiometric excess of benzene, separation of the catalyst, fractionation of the products of the alkylation stage and recycle of unreacted paraffins and benzene, the paraffins having a high impurity content are purified by treating them with concentrated sulphuric acid, oleum or sulphuric anhydride before being recycled.

DESCRIPTION OF THE PREFERRED EMBODIMENTS

In carrying out the process of the invention the recycle paraffins with a high impurity content are treated with concentrated sulphuric acid titrating about 100% $H_2SO_4$, with oleum or sulphuric anhydride, in a quantity of 0.5 to 10, preferably 1 to 5, parts to 100 parts by weight of the paraffins.

This treatment may be carried out at a temperature from room temperature (20° C.) to about 120° C. The lower temperatures within the range are used when employing sulphuric anhydride, and intermediate or higher temperatures when oleum or concentrated sulphuric acid, respectively, are employed as purification agents. Thus, for instance, with 100% sulphuric acid the optimum temperatures are 90° to 110° C., whereas wtih oleum having a sulphuric anhydride content of 20%, the temperatures of 50 to 80° C. are preferably used.

The treatment may be carried out with apparatus of known type which is suitable for contacting liquids differing in density when concentrated sulphuric acid or oleum are employed as purification agents. Reactors provided with stirrers, stacks of perforated discs or even mixing valves may be employed.

The time for which the paraffins and purifying agent are in contact are not critical; periods of the order of seconds are sufficient for effecting the desired purification. After the treatment with acid the mixture is cooled and decanted in order to separate the acid sludge.

Finally, the paraffins are separated and treated, such as by percolation on activated clay, in order to remove any acid residue.

The purification step of the invention may be carried out either continuously or discontinuously, on part or all of the paraffins to be recycled. The by-products may be removed completely or may be kept below a desired limit. Alkylbenzenes are thus prepared with an extremely low content of by-products, and free from unpleasant smell.

Of the following examples, Example 1 illustrates the known process and Example 2 illustrates the purification step of the present invention.

EXAMPLE 1

A tubular reactor was charged with about 210 kg./hour of gaseous chlorine and 1,650 kg./hour of linear $C_{10}$-$C_{14}$ paraffins comprising 70% by weight of recycle paraffins, the remaining 30% being fresh paraffins titrating about 99% n-paraffins. The percentage by weight of the n-paraffins, determined by gas chromatographic analysis, was as follows:

|  | Percent |
|---|---|
| $C_{10}$ | 10.8 |
| $C_{11}$ | 39.4 |
| $C_{12}$ | 28.5 |
| $C_{13}$ | 15.4 |
| $C_{14}$ | 5.9 |

The paraffins were chlorinated at a temperature of about 110° C. The chlorinated products were freed from hydrochloric acid by degassing and then charged to the alkylation stage together with 980 kg./hour approximately of benzene and 180 kg./hour catalytic sludge. The latter consisted of the exhausted products discharged by the reactor and enriched with aluminum trichloride in a quantity of about 10% by weight of the sludge.

The alkylation was carried out by means of two reactors each equipped with a stirrer and arranged in series, in order to prevent any chloroparaffins from passing unreacted to the outlet of the alkylation reaction, due to unavoidable "short-circuiting" processes.

The reaction temperature was 60° C., and the volume of the two reactors provided an overall residence time of about 1 hours at the alkylation stage.

The alkylation products were then decanted to separate the catalytic sludge, washed with a 5% sodium hydroxide solution, then with water to neutrality, and finally fractionated in order to separate benzene, unaltered paraffins and alkylbenzenes.

About 1,150 kg./hour paraffins were recovered for recycle, as well as 600 kg./hour alkylbenzenes.

At the bottom of the distillation column for the alkylbenzenes, heavy products were recovered in a quantity of about 90 kg./hour. By proceeding under these conditions, after approximately three months' run the alkylbenzenes had a chlorine content exceeding 1,000 p.p.m.; moreover, the content of recycle paraffins had fallen to about 93% with an alkylbenzene content of about 3% by weight. Moreover, the alkylbenzenes had a pungent paraffinic smell.

EXAMPLE 2

The procedure of Example 1 was repeated until the chlorine content in alkylbenzenes amounted to about 200 p.p.m.

At this stage there was commenced treatment of the recycle paraffins with 20% oleum in sulphuric anhydride in a quantity of 2 parts by weight to 100 parts by weight paraffins. Thus, the recycle paraffins recovered from the distillation stage in a quantity of about 1,150 kg./hour were fed through a mixing valve together with about 23 kg./hour oleum, the operation being carried out at a temperature of about 65° C.

The acid sludge was then decanted at room temperature, and the paraffins were percolated through attapulgite in order to remove acid products, and then charged together with fresh paraffins to the chlorination stage.

The chlorine content in the alkylbenzenes was thus lowered to about 50 p.p.m., and was maintained at this level during the subsequent operation. The alkylbenzenes were moreover free from disagreeable smells.

What is claimed is:

1. In a process for preparing alkylbenzenes comprising the steps of:
   partially chlorinating linear paraffins having 9 to 15 carbon atoms per molecule to form chlorinated paraffins,
   alkylating the chlorinated paraffins with excess benzene in the presence of catalyst,
   separating the catalyst from the reaction mixture,
   fractionating the reaction mixture by distillation, and recycling unreacted benzene and paraffins to the chlorination step,
   the improvement which comprises contacting the unreacted paraffins at a temperature of from 20 to 120° C. with from 0.5 to 10 parts by weight, per 100 parts by weight of said paraffins, of a purification reactant selected from the group consisting of concentrated sulphuric acid, oleum and sulphuric anhydride so as to remove by-products from the paraffins before they are recycled.

2. The process of claim 1 wherein said purification reactant is concentrated sulfuric acid and wherein the temperature at which said unreacted paraffins and said purification reactant are contacted varies from 90 to 110° C.

3. The process of claim 1 wherein said purification reactant is oleum having a sulfuric anhydride content of about 20% and wherein the temperature at which said unreacted paraffins are contacted with said purification reactant varies from 50 to 80° C.

4. The process of claim 2 further comprising cooling the mixture resulting from the contacting of said unreacted paraffins with said concentrated sulfuric acid and decanting whereby the acid sludge which is formed is removed from said mixture.

5. The process of claim 4 further comprising separating said paraffins and removing any acid residue therefrom by percolation through activated clay.

6. The process of claim 1 wherein only a portion of the paraffins to be recycled are contacted with said purification reactant.

7. The process of claim 1 wherein said unreacted paraffins are contacted with from 1 to 5 parts, by weight, per 100 parts of said paraffins of said purification reactant.

References Cited

UNITED STATES PATENTS

| | | | |
|---|---|---|---|
| 3,259,664 | 7/1966 | Ray et al. | 260—671 X |
| 3,365,508 | 1/1968 | Kapur et al. | 260—671 |
| 3,403,194 | 9/1968 | Feighner et al. | 260—671 |
| 3,274,278 | 9/1966 | Kapur et al. | 260—671 B |
| 3,316,294 | 4/1967 | Feighner et al. | 260—671 B |
| 3,391,210 | 7/1968 | Feighner et al. | 260—671 B |

CURTIS R. DAVIS, Primary Examiner